United States Patent
Fremont et al.

(10) Patent No.: US 11,474,545 B2
(45) Date of Patent: Oct. 18, 2022

(54) THERMAL BYPASS VALVE

(71) Applicant: Fremont and Murphy LLC, Ann Arbor, MI (US)

(72) Inventors: Bradley C. Fremont, Tonawanda, NY (US); Lawrence Anthony Diller Murphy, Whitmore Lake, MI (US)

(73) Assignee: Fremont and Murphy LLC, Ann Arbor, MI (US)

( * ) Notice: Subject to any disclaimer, the term of this patent is extended or adjusted under 35 U.S.C. 154(b) by 11 days.

(21) Appl. No.: 17/147,730

(22) Filed: Jan. 13, 2021

(65) Prior Publication Data
US 2022/0221884 A1  Jul. 14, 2022

(51) Int. Cl.
*G05D 23/10* (2006.01)

(52) U.S. Cl.
CPC .................................. *G05D 23/10* (2013.01)

(58) Field of Classification Search
CPC ......... G05D 23/08; G05D 23/10; F16K 31/56
USPC ............................................ 236/34.5, 101 E
See application file for complete search history.

(56) References Cited

U.S. PATENT DOCUMENTS

| | | |
|---|---|---|
| 2,857,103 A | 10/1958 | Hajny |
| 3,404,837 A | 10/1968 | James |
| 3,411,712 A | 11/1968 | O'Hara et al. |
| 3,587,963 A | 6/1971 | Meulendyk et al. |
| 3,930,613 A | 1/1976 | Place |
| 4,068,800 A | 1/1978 | Doherty, Jr. |
| 4,103,824 A * | 8/1978 | Seifert ............ F01P 7/16 236/101 E |
| 4,139,151 A | 2/1979 | Thornburg |
| 4,247,041 A | 1/1981 | Kitamura et al. |
| 4,388,196 A | 6/1983 | Lucia |
| 4,615,482 A * | 10/1986 | Marusiak ........... G05D 23/1333 236/87 |
| 4,830,277 A * | 5/1989 | Hood .................. G05D 23/10 236/93 R |
| 5,263,643 A | 11/1993 | Wells et al. |
| 6,007,711 A | 12/1999 | Atwood |
| 8,978,992 B2 * | 3/2015 | Zillig ................ F16K 11/22 137/625.49 |
| 9,267,390 B2 | 2/2016 | Lo |
| 9,581,237 B2 | 2/2017 | Stevens |

* cited by examiner

*Primary Examiner* — Marc E Norman
(74) *Attorney, Agent, or Firm* — Simpson & Simpson, PLLC

(57) ABSTRACT

A thermal bypass valve for diverting fluid, including an inlet, a chamber in fluid communication with the inlet, a bimetallic disc pivotably arranged in the chamber, a first outlet in fluid communication with the chamber, and a second outlet in fluid communication with the chamber, wherein the bimetallic disc is operatively arranged to, in a first state, divert fluid to the first outlet, and in a second state, when the fluid reaches a predetermined temperature, divert the fluid to the second outlet.

16 Claims, 7 Drawing Sheets

THERMAL BYPASS VALVE

FIELD

The present disclosure relates to thermal bypass systems, and more particularly, to a thermal bypass valve including a bimetallic disc.

BACKGROUND

Thermal bypass valves and systems are used in automobiles and other vehicles that require cooling of fluid. Thermal bypass systems are arranged to divert fluid, such as transmission fluid, antifreeze or other coolant fluid (e.g., battery cooling fluid), oil, etc., to either a component to be cooled (e.g., transmission, battery, radiator, etc.) or a cooler. If the temperature of the fluid is less than a predetermined temperature, the thermal bypass system diverts the fluid to the component to be cooled. If the fluid exhibits a temperature that is greater than or equal to the predetermined temperature, the thermal bypass system diverts the fluid to the cooler.

Current thermal bypass systems utilize wax actuators, for example, in sliding spool type valves. A wax actuator uses paraffin wax arranged within a piston. As the wax increases in temperature it expands, thereby expanding the cylinder, and as the wax decreases in temperature it contracts, and a spring returns the cylinder to its original position (i.e., contracts the cylinder). Thermal bypass systems utilize these wax actuators to shift an output in a fluid tube. For example, the system may include a tube including a first end, a second end, and a first hole in the side wall between the first end and the second end. The tube is slidingly and concentrically arranged with respect to a second tube, the second tube including a second side wall hole and a third side wall hole arranged adjacent each other. When the fluid temperature is greater than or equal to a predetermined temperature, the wax actuator expands and shifts the first tube such that the first hole is aligned with the third hole, thereby diverting fluid to a cooler. In other words, current spool designs embody a spool that moves to block/unblock passages in the wall of the bore. When the fluid temperature is less than the predetermined temperature, the wax actuator contracts and shifts the first tube such that the first hole is aligned with the second hole, thereby diverting fluid to a component to be cooled. However, there are significant problems with such design. If, for example, debris gather between the first tube and the second tube, the tubes will no longer easily slide with respect to each other, or get stuck. If the tubes no longer slide, then fluid may not get cooled causing catastrophic failure in a component to be cooled. In fact, sliding spool type valves driven by a thermal element (e.g., wax actuator) and return by spring pressure often fail in a bypass mode, which is not desirable because fluid is prevented from flowing to the cooler (i.e., fluid temperature continues to rise leading to failure of other system components). Also, if the tubes get stuck together, the wax actuator/piston cylinder will not be able to expand; however, the wax will continue to expand and cause the wax actuator to fail, lose wax/stroke, expand and lose calibration, or explode and destroy a component, for example, the transmission. Furthermore, wax elements have a short life expectancy, for example, only 30,000 cycles.

Thus, there has been a long-felt need for a thermal bypass valve system that efficiently diverts fluid based on its temperature, has a longer life expectancy, and, in the event of failure, does not result in any damage to other elements.

SUMMARY

According to aspects illustrated herein, there is provided a thermal bypass valve for diverting fluid, comprising an inlet, a chamber in fluid communication with the inlet, a bimetallic disc pivotably arranged in the chamber, a first outlet in fluid communication with the chamber, and a second outlet in fluid communication with the chamber, wherein the bimetallic disc is operatively arranged to, in a first state, divert fluid to the first outlet, and in a second state, when the fluid reaches a predetermined temperature, divert the fluid to the second outlet.

In some embodiments, the thermal bypass valve further comprises a pressure relief valve fluidly arranged between the inlet and the first outlet. In some embodiments, the pressure relief valve comprises a spring and a ball. In some embodiments, the thermal bypass valve further comprises a check valve fluidly arranged between the second outlet and the first outlet. In some embodiments, the check valve comprises a ball idly arranged in a check valve passage. In some embodiments, the chamber is wedge shaped. In some embodiments, the chamber comprises a first curvilinear surface and a second curvilinear surface directed toward the first curvilinear surface. In some embodiments, the chamber further comprises a first lip extending from the first curvilinear surface, and a second lip extending from the second curvilinear surface, wherein a passage is formed between the first lip and the second lip. In some embodiments, the first curvilinear surface comprises a first radius, the second curvilinear surface comprises a second radius, and the bimetallic disc comprises a third radius, the third radius being greater than the first radius and the second radius. In some embodiments, in a third state, the bimetallic disc is operatively arranged to divert fluid to both the first outlet and the second outlet.

According to aspects illustrated herein, there is provided a thermal bypass valve for diverting fluid, comprising a first inlet, a chamber in fluid communication with the inlet, a bimetallic disc pivotably arranged in the chamber, a first outlet in fluid communication with the chamber, a second inlet in fluid communication with the first outlet, and a second outlet in fluid communication with the chamber, wherein the bimetallic disc is operatively arranged to in a first state, divert fluid to the first outlet, and in a second state, when the fluid reaches a predetermined temperature, divert the fluid to the second outlet.

In some embodiments, the thermal bypass valve further comprises a pressure relief valve fluidly arranged between the first inlet and the first outlet, the pressure relief valve being biased toward a sealed position. In some embodiments, the thermal bypass valve further comprises a check valve fluidly arranged between the second outlet and the second inlet. In some embodiments, the check valve comprises a check valve passage and a ball idly arranged in the check valve passage. In some embodiments, the chamber is wedge shaped. In some embodiments, the chamber comprises a first curvilinear surface, and a second curvilinear surface directed toward the first curvilinear surface. In some embodiments, the chamber further comprises a first lip extending from the first curvilinear surface, and a second lip extending from the second curvilinear surface, wherein a passage is formed between the first lip and the second lip. In some embodiments, the first curvilinear surface comprises a first radius, the second curvilinear surface comprises a second radius, and the bimetallic disc comprises a third radius, the third radius being greater than the first radius and the second radius. In some embodiments, the chamber and the first inlet are linearly aligned.

In some embodiments, the first inlet is linearly aligned with the chamber due to inserts located below a mating surface of the inferior component. In some embodiments, the first inlet is linearly aligned with the chamber due to an appendage or boss from the superior component extending into a hole in the inferior component, the appendage or boss forming the top of the chamber.

According to aspects illustrated herein, there is provided a thermal bypass valve for diverting fluid, comprising an inlet, a wedge-shaped chamber in fluid communication with the inlet, a bimetallic disc arranged in the chamber, a first outlet in fluid communication with the chamber, a second outlet in fluid communication with the chamber, and a check valve fluidly arranged between the first outlet and the second outlet, wherein the bimetallic disc is operatively arranged to in a first state, divert fluid to the first outlet, and in a second state, when the fluid reaches a predetermined temperature, divert the fluid to the second outlet.

According to aspects illustrated herein, there is provided a thermal bypass valve comprising a bimetallic disc. The bimetallic disc is arranged in a space between a superior component and an inferior component and switches from side to side depending on temperature. In a first state, the bimetallic disc is displaced downward toward the inferior component, which allows fluid (e.g., transmission fluid) to flow from the inlet, past the bimetallic disc valve and up through the outlet to the transmission/pump/tank. In a second state, the bimetallic disc is displaced upward toward the superior component, which forces the transmission fluid to flow downward and then to the cooler before circling back around to the outlet and to the transmission/pump/tank. The bimetallic disc displaces or bends when the temperature of the fluid reaches a certain level. In essence, the fluid continues to flow and cycle through the component (e.g., transmission) until it gets too hot, at which point the bimetallic disc displaces and forces the fluid through the cooler. Once the temperature of the fluid is reduced, the bimetallic disc displaces/bends/switches back to the original down position. It should be appreciated that the fluid flow may also assist in the disc's travel (i.e., up and down).

According to aspects illustrated herein, there is provided a thermal bypass valve, comprising an inlet, a chamber, a bimetallic disc arranged in the chamber, a first outlet, and a second outlet, wherein the bimetallic disc is operatively arranged to divert fluid to the first outlet, and when the fluid reaches a preset temperature, divert the fluid to the second outlet. In some embodiments, the thermal bypass valve further comprises a pressure relief valve fluidly arranged between the inlet and the first outlet. In some embodiments, the pressure relief valve comprises a spring and a ball.

These and other objects, features, and advantages of the present disclosure will become readily apparent upon a review of the following detailed description of the disclosure, in view of the drawings and appended claims.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

Figure 1:
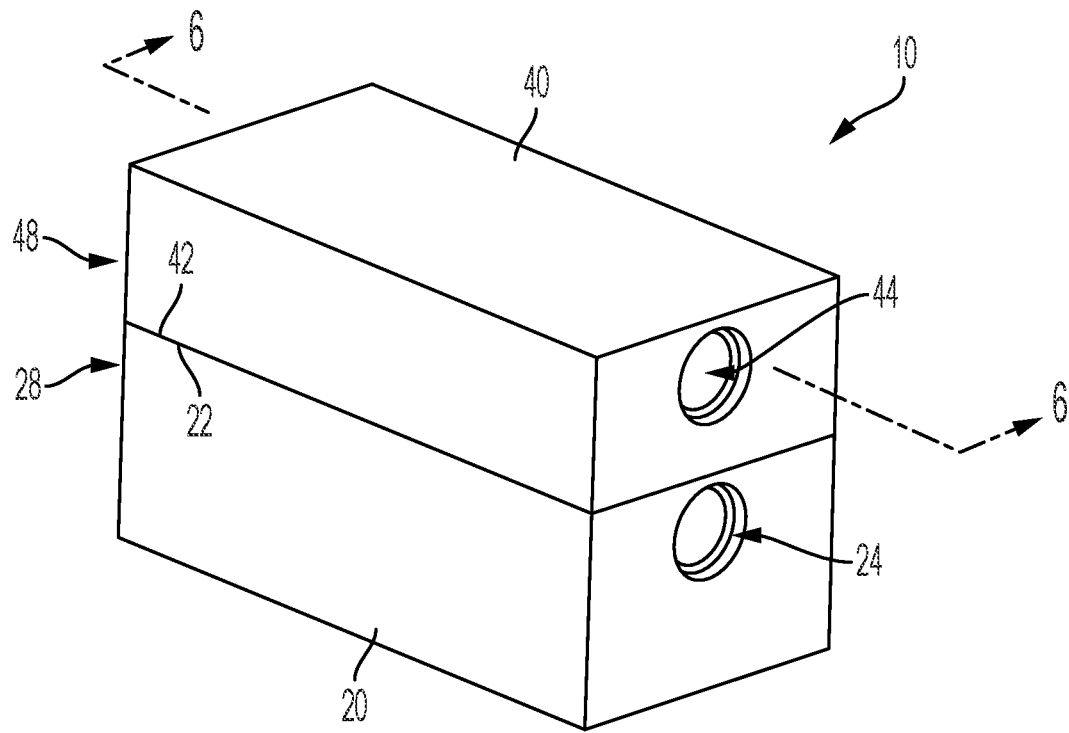
FIG. 1 is a perspective view of a thermal bypass valve.

At the outset, it should be appreciated that like drawing numbers on different drawing views identify identical, or functionally similar, structural elements. It is to be understood that the claims are not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the claims.

Unless defined otherwise, all technical and scientific terms used herein have the same meaning as commonly understood to one of ordinary skill in the art to which this disclosure pertains. It should be understood that any methods, devices or materials similar or equivalent to those described herein can be used in the practice or testing of the example embodiments.

It should be appreciated that the term "substantially" is synonymous with terms such as "nearly," "very nearly," "about," "approximately," "around," "bordering on," "close to," "essentially," "in the neighborhood of," "in the vicinity of," etc., and such terms may be used interchangeably as appearing in the specification and claims. It should be appreciated that the term "proximate" is synonymous with terms such as "nearby," "close," "adjacent," "neighboring," "immediate," "adjoining," etc., and such terms may be used interchangeably as appearing in the specification and claims. The term "approximately" is intended to mean values within ten percent of the specified value.

It should be understood that use of "or" in the present application is with respect to a "non-exclusive" arrangement, unless stated otherwise. For example, when saying that "item x is A or B," it is understood that this can mean one of the following: (1) item x is only one or the other of A and B; (2) item x is both A and B. Alternately stated, the word "or" is not used to define an "exclusive or" arrangement. For example, an "exclusive or" arrangement for the statement "item x is A or B" would require that x can be only one of A and B. Furthermore, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element.

Moreover, as used herein, the phrases "comprises at least one of" and "comprising at least one of" in combination with a system or element is intended to mean that the system or element includes one or more of the elements listed after the phrase. For example, a device comprising at least one of: a first element; a second element; and, a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element. A similar interpretation is intended when the phrase "used in at least one of:" is used herein. Furthermore, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element.

Figure 2:
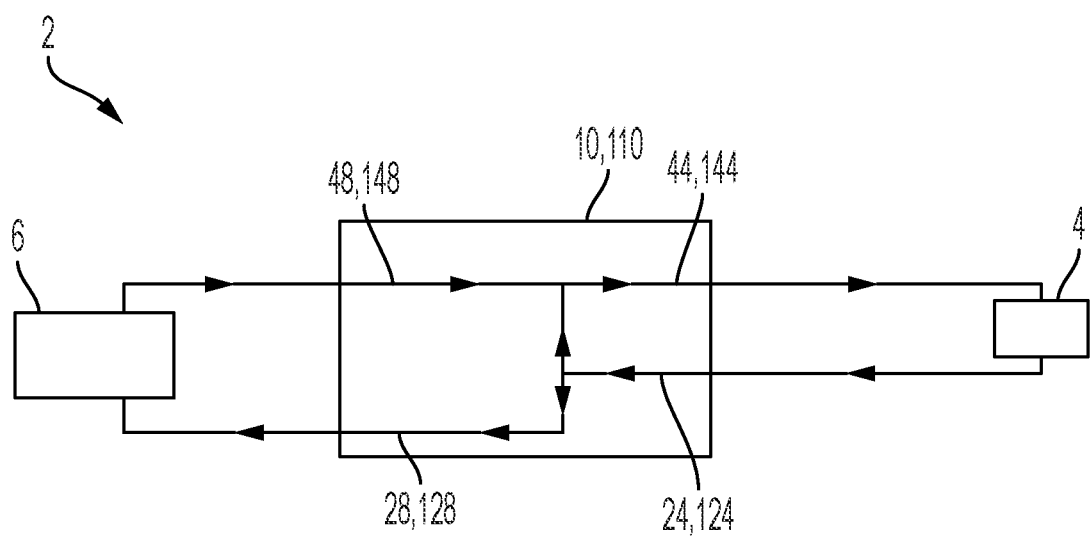
FIG. 2 is a schematic view of a cooling system.
Figure 3:
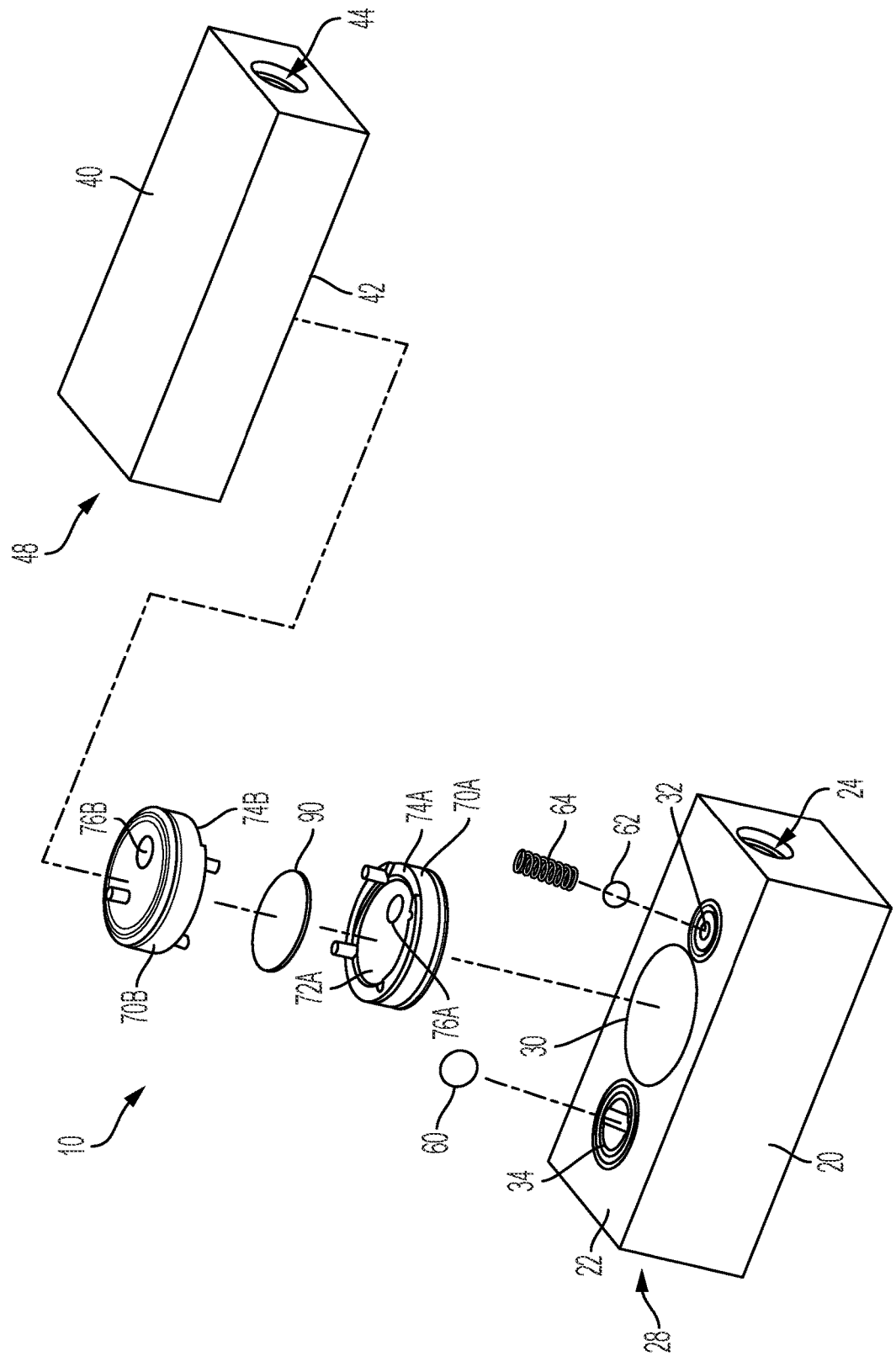
FIG. 3 is an exploded perspective view of the thermal bypass valve shown in FIG. 1.
Figure 4:
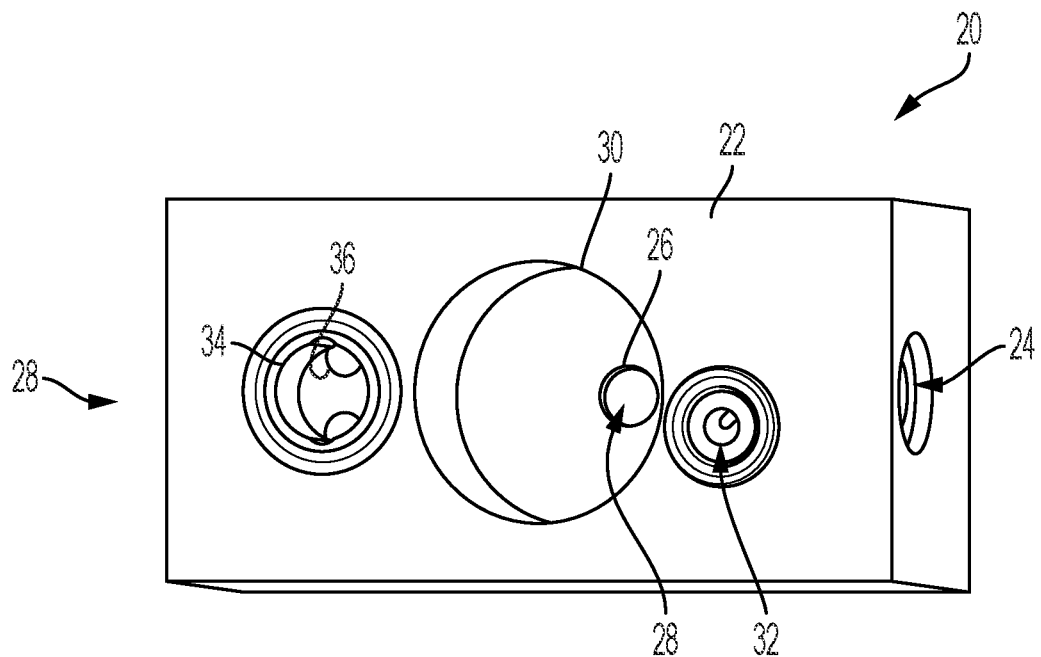
FIG. 4 is a perspective view of the inferior component shown in FIG. 1.
Figure 5:
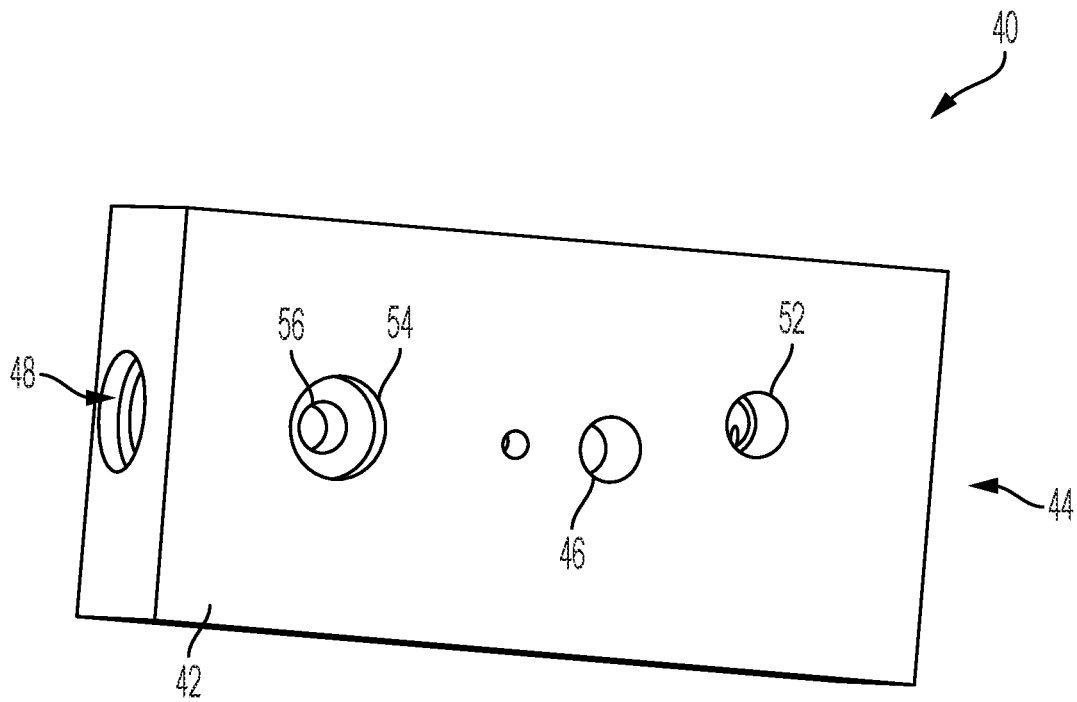
FIG. 5 is a perspective view of the superior component shown in FIG. 1.
Figure 6A:
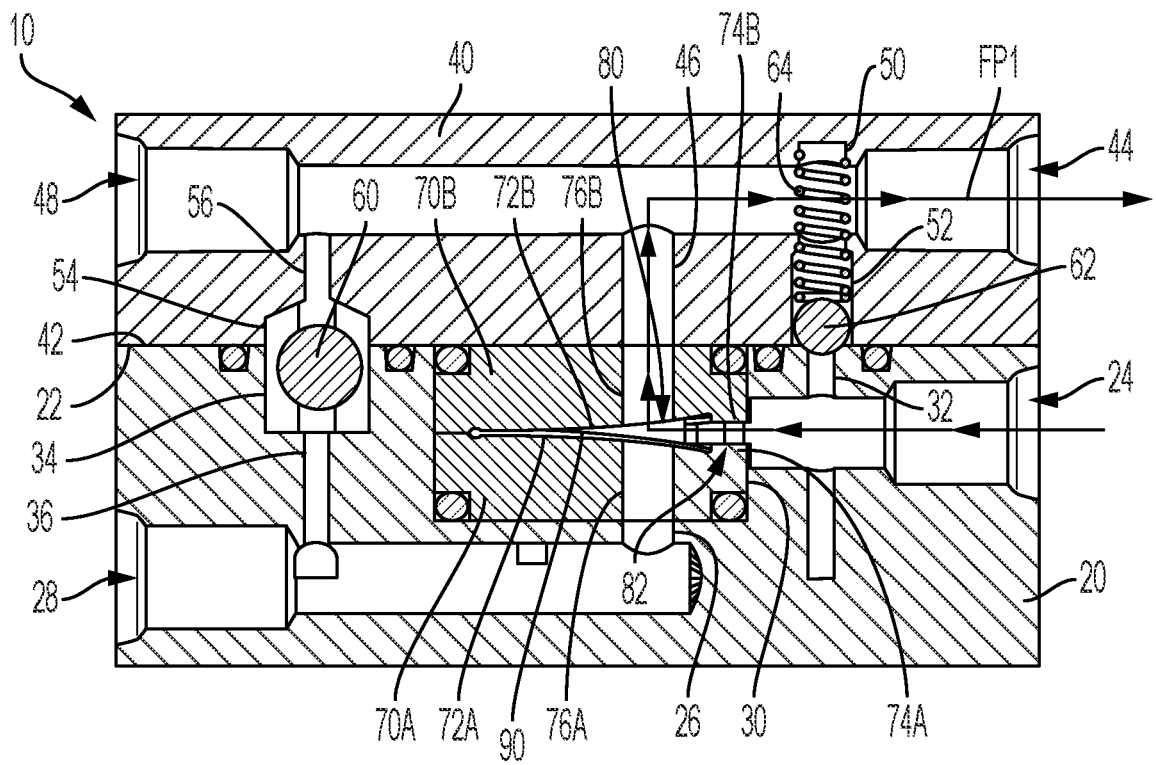
FIG. 6A is a cross-sectional view of the thermal bypass valve taken generally along line 6-6 in FIG. 1, in a first state.
Figure 6B:
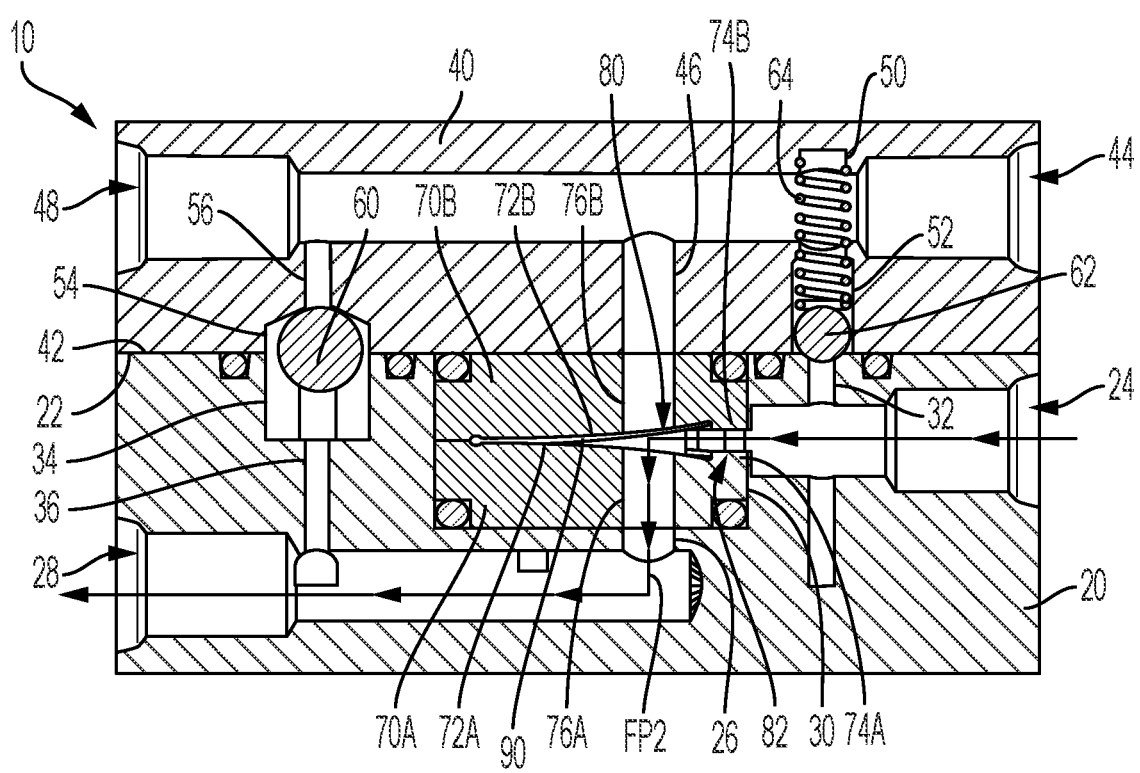
FIG. 6B is a cross-sectional view of the thermal bypass valve taken generally along line 6-6 in FIG. 1, in a second state.
Figure 6C:
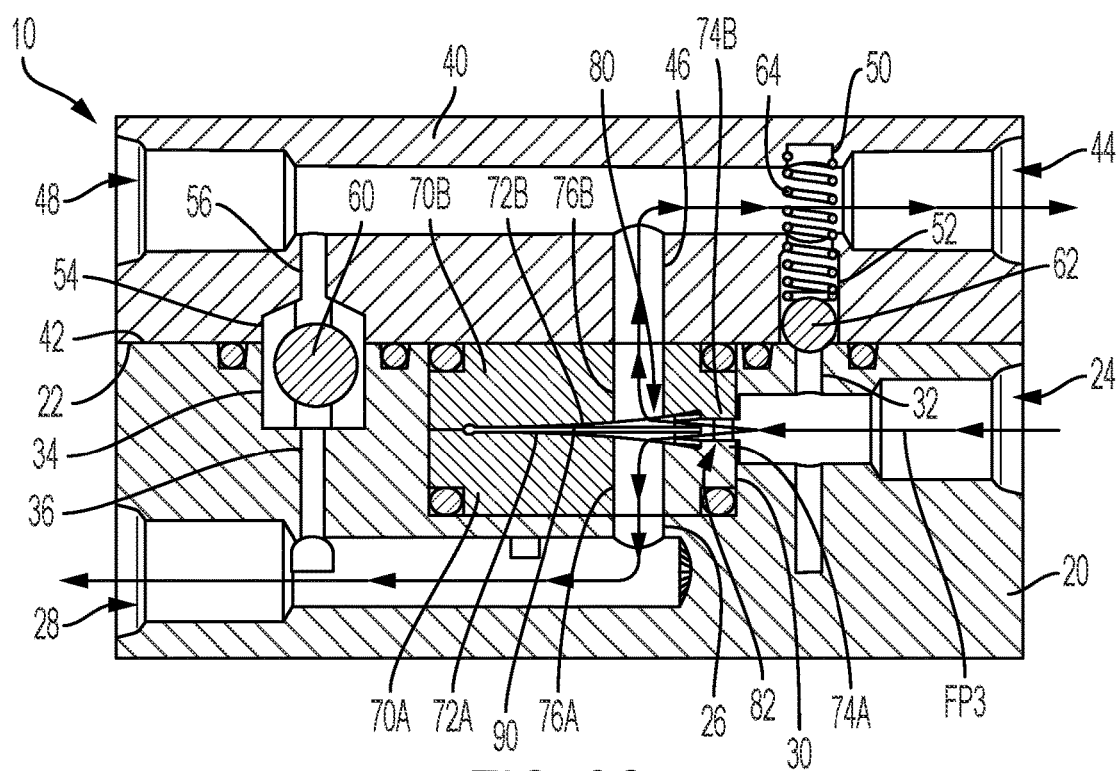
FIG. 6C is a cross-sectional view of the thermal bypass valve taken generally along line 6-6 in FIG. 1, in a third state.

Adverting now to the figures, FIG. 1 is a perspective view of thermal bypass valve 10. FIG. 2 is a schematic view of cooling system 2. FIG. 3 is an exploded perspective view of thermal bypass valve 10. FIG. 4 is a perspective view of inferior component 20. FIG. 5 is a perspective view of superior component 40. FIG. 6A is a cross-sectional view of thermal bypass valve 10 taken generally along line 6-6 in FIG. 1, in a first state (i.e., enabling bypass flow). FIG. 6B is a cross-sectional view of thermal bypass valve 10 taken generally along line 6-6 in FIG. 1, in a second state (i.e., enabling cooler flow). FIG. 6C is a cross-sectional view of thermal bypass valve 10 taken generally along line 6-6 in FIG. 1, in a third state (i.e., enabling both bypass flow and cooler flow). Thermal bypass valve 10 generally comprises inferior component 20, superior component 40, and bimetallic disc 90. The following description should be read in view of FIGS. 1-6C.

Inferior component 20 comprises surface 22 operatively arranged to engage superior component 40, inlet 24, outlet 28, and chamber 80, as will be described in greater detail below. Inlet 24 is fluidly connected to and receives fluid from a component to be cooled, or component 4. The fluid may comprise, for example, transmission fluid, antifreeze or other coolant (e.g., battery cooling fluid), oil, etc. Component 4 may comprise a transmission, battery, radiator, engine, or any other component of an automobile or vehicle or device that requires cooling. Outlet 28 is fluidly connected to cooler 6. Cooler 6 is operatively arranged to decrease the temperature of the fluid. Inferior component 20 further comprises hole or cavity 30 extending from surface 22, and hole 26 extending from surface 22 (or hole 30) to outlet 28. Inlet 24, hole 26, and outlet 28 create flow path FP2, as will be described in greater detail with respect to FIG. 6B.

Inferior component 20 further comprises hole 32, hole 36, and hole 34. Hole 32 extends from surface 22 and is at least partially aligned with hole 52 of superior component 40. Hole 32 is in fluid communication with inlet 24 and outlet 44 to create a pressure relief valve, as will be described in greater detail below. Hole 36 extends from surface 22 and is at least partially aligned with hole 54 and/or hole 56 of superior component 40. In some embodiments, and as shown in FIG. 4, inferior component 20 comprises two holes 36. Holes 36 are in fluid communication with outlet 28 and inlet 48 to create a check valve, as will be described in greater detail below. Hole 34 extends from surface 22 and is operatively arranged to engage ball 60. In some embodiments, inferior component 20 comprises aluminum, plastic, wood, cast iron, or any other suitable material for fluid flow.

Superior component 40 comprises surface 42 operatively arranged to engage inferior component 20, outlet 44, and inlet 48. Outlet 44 is fluidly connected to component 4. Outlet 44 is operatively arranged to direct fluid to component 4 in the first state (see bypass flow of FIG. 6A). In some embodiments, outlet 44 is operatively arranged to direct cooled fluid to component 4 in the second state (i.e., cooler flow) or in the third state (i.e., failure mode flow), as will be described in greater detail below. Superior component 40 further comprises hole 46 extending from surface 42 to outlet 44. Inlet 24, hole 46, and outlet 44 create flow path FP1, as will be described in greater detail with respect to FIG. 6A.

Superior component 40 further comprises hole 50, hole 52, hole 56, and hole 54.

Hole 50 extends from surface 42 and is at least partially aligned with hole 32 of inferior component 20. Hole 52 extends from surface 42 and is at least partially aligned with hole 32 of inferior component 20. Holes 50 and 52 extend from inlet 24 to outlet 44. As best shown in FIGS. 6A-6C, spring 64 comprises a first end seated and/or arranged in hole 50 and a second end generally arranged in hole 52. Ball 62 is arranged in hole 52 and engages the second end of spring 64. Spring 64 biases ball 62 towards inferior component 20 such that ball 62 is seated on hole 32 and prevents fluid flow from hole 32 to holes 50 and 52. In case of a downstream pressure build up, ball 62 will be forced away from hole 32 thereby compressing spring 64 and allowing fluid flow from hole 32 to holes 50 and 52 and thus to outlet 44. This system, namely, holes 32, 50, and 52, ball 62, and spring 64 is referred to herein as a pressure relief valve. Release of the pressure relief valve would occur if the pressure at inlet 24 is greater than the predetermined relief pressure, determined by spring force and seal area, and fluid pressure at outlet 44, for example, if there is some blockage in cooler flow path FP2 (i.e., cooler 6, hole 26, or outlet 28) or in bypass flow path FP1 (i.e., passage 82 or hole 46).

Hole 56 extends from surface 42 and is in fluid communication with inlet 48 and outlet 28, via hole(s) 36. Hole 54 extends from surface 42 is also in fluid communication with inlet 48 and outlet 28, via hole(s) 36. Hole 54 may be a counterbore and/or a countersink to hole 56 and may include a cylindrical portion and a frusto-conical portion. Hole 54 is arranged to engage ball 60. As best shown in FIGS. 6A-6C, ball 60 is idly arranged within hole 34 and/or hole 54. By idly it is meant that there is no biasing element engaged with ball 60, and ball 60 is allowed to float within holes 34 and 54. At times of high pressure within outlet 28 compared to that of inlet 48, ball 60 is forced upward and into engagement with the frusto-conical portion of hole 54, thereby fluidly blocking hole 56. Such blockage prevents fluid from flowing from outlet 28 to inlet 48 through holes 36 and 56. Contrarily, at times of immediate high pressure within inlet 48 compared to that of outlet 28, ball 60 is unseated from hole 56 and allows fluid flow between inlet 48 and outlet 28 through holes 56 and 36. This system, namely, holes 34, 36, 54, and 56, and ball 60 is referred to herein as a check valve. Seal of the check valve generally occurs when thermal bypass valve 10 switches from the first state, or bypass flow path FP1, shown in FIG. 6A, to the second state, or cooler flow path FP2, shown in FIG. 6B. Opening of the check valve generally occurs when thermal bypass valve 10 switches from the second state, or cooler flow path FP2, shown in FIG. 6B, to the first state, or bypass flow path FP1, shown in FIG. 6A. In some embodiments, superior component 40 comprises aluminum, plastic, wood, cast iron, or any other suitable material for fluid flow.

Insert 70A and insert 70B are arranged in hole 30 with their respective surfaces 72A and 72B directed toward each other, creating chamber 80. In some embodiments, inserts 70A-B are connected via pins or pegs or dowels; however, it should be appreciated that inserts 70A-B may be connected using any suitable means, for example, bolts, rivets, screws, nails, adhesives, interference fit within hole 30, etc., or simply pressure from abutment against surface 42. In some embodiments, inserts 70A-B comprise RYTON® polyphenylene sulfide (PPS) material. It should be appreciated that pins allow for both easy assembly alignment and provide a durable wear surface to prevent binding between disc 90 and inserts 70A-B and components 20 and 40. Specifically, the pins prevent bimetallic disc 90 from damaging inferior component 20, superior component 40, or inserts 70A-B, since bimetallic disc 90 may comprise a harder material than that of the surrounding components. Thus, pins should comprise a generally hard material, such as steel. In some embodiments, and as shown in FIG. 3, thermal bypass valve 10 comprises four pins that generally surround disc 90. In some embodiments, inserts 70A-B can be integrated into or integrally formed with components 20 and 40.

Insert 70A comprises surface 72A, lip or protrusion 74A, and hole 76A. Surface 72A is a curvilinear surface comprising a first radius. Lip 74A extends outward from surface 72A. Hole 76A extends from chamber 80 to hole 26. Insert 70B comprises surface 72B, lip or protrusion 74B, and hole 76B. Surface 72B is a curvilinear surface comprising a second radius, the second radius being substantially equal to the first radius. Lip 74B extends outward from surface 72B. Hole 76B extends from chamber 80 to hole 46. When properly assembled, surfaces 72A-B form a wedge-shaped chamber 80 and lips 74A-B form passage 82. Passage 82 allows fluid flow from inlet 24 to either outlet 28 (flow path FP2) or outlet 44 (flow path FP1).

Disc 90 is arranged in chamber 80. Disc 90 is a bimetallic disc. As is known in the art, a bimetallic disc comprises at least two metals (e.g., iron and manganese). As the temperature changes the metals will flex and pull against each other. Since the metals expand and contract at different rates (i.e., each metal has a different thermal expansion coefficient), each side can be formed to flex (or snap) at a desired temperature. It should be appreciated that the materials of disc 90 can be chosen for the desired effect (e.g., different actuation temperature ranges). Disc 90 exhibits curvature in both states, the curvature of both states having a third radius. In some embodiments, the third radius is greater than the first and second radii of surfaces 72A-B. This allows the seal between disc 90 and surfaces 72A-B to occur right at the port (i.e., holes 76A-B) and some fluid to exist between disc 90 and the sealed surface 72A or 72B, reducing the pressure differential across disc 90 and allowing easier snapping when there is a temperature change. Disc 90 is arranged such that a first end is arranged proximate passage 80 and lips 74A-B and a second end is arranged distal to passage 80 and lips 74A-B. In some embodiments, Disc 90 "floats" relative to inserts 70A-B; that is to say disc 90 is not fixedly connected to, or pinched by, inserts 70A-B. The floating design of disc 90 and the face seal (i.e., formed between disc and surfaces 72A-B) is less susceptible to debris that might cause binding in current thermal valve systems. In some embodiments, disc 90 is connected at its distal end to inserts 70A-B (i.e., pinched or fastened with some other method in the smaller wedge portion of chamber 80). In some embodiments, disc 90 is fixedly secured on a first end to inserts 70A-B. In some embodiments, disc 90 is connected to inserts 70A-B via a pin passing through a hole in disc 90. Disc 90, namely the proximal portion thereof, is operatively arranged to pivot or flip back and forth from engagement with insert 70A and insert 70B based on fluid temperature. It should be appreciated that while disc 90 is shown as a generally circular disc, other geometric shapes may be used. For example disc 90 may comprise a plate shaped as a rectangle, square, oval, ellipsoid, trapezoid, etc. It should be further appreciated that, while thermal bypass valve 10 only shows one disc 90, in some embodiments a plurality of discs may be stacked and arranged in chamber 80.

FIG. 6A shows thermal bypass valve 10 in a first state, which directs fluid to bypass flow path FP1 (i.e., bypass flow is open and cooler flow is closed). In the first state, the fluid temperature, and thus the temperature of disc 90, is below a predetermined temperature and disc 90 is directed or pivoted toward engagement with surface 72A of insert 70A. Such arrangement blocks fluid flow into hole 76A and thus hole 26 and outlet 28. In bypass flow path FP1, fluid flows (from component 4) into inlet 24, through passage 82 and into chamber 80. With bimetallic disc 90 flexed downward, fluid then flows up through hole 76B and hole 46 and exits thermal bypass valve 10 through outlet 44 (and back to component 4). It should be appreciated that the proximal end of disc 90 is tucked beneath lip 74A. This prevents the fluid flow from lifting disc 90 up off of surface 72A. It should also be appreciated that ball 60 of the check valve is in a neutral or idle state (i.e., unseated from hole 56). Bypass flow path FP1 occurs when the temperature of the fluid does not require cooling.

FIG. 6B shows thermal bypass valve 10 in a second state, which directs fluid to cooler flow path FP2 (i.e., bypass flow is closed and cooler flow is open). The switch to cooler flow occurs when the fluid temperature, and thus the temperature of disc 90, is greater than or equal to the predetermined temperature and disc 90 snaps over such that it is directed or pivoted toward engagement with surface 72B of insert 70B. Such arrangement blocks fluid flow into hole 76B and thus hole 46 and outlet 44 (upstream fluid pressure encourages disc 90 to seal). In cooler flow path FP2, fluid flows (from component 4) into inlet 24, through passage 82 and into chamber 80. With bimetallic disc 90 flexed upward, fluid then flows down through hole 76A and hole 26 and exits thermal bypass valve 10 through outlet 28 (to cooler 6). It should be appreciated that the proximal end of disc 90 is tucked beneath lip 74B. This prevents the fluid flow from lifting disc 90 up off of surface 72B. In some embodiments, and as shown in FIG. 2, fluid then flows from cooler 6 back into thermal bypass valve 10 through inlet 48 and to component 4 via outlet 44. In some embodiments, cooler 6 may return cooled fluid to component 4 via other means (i.e., not through inlet 48 and outlet 44). In such embodiments, thermal bypass valve 10 may or may not comprise inlet 48 (i.e., thermal bypass valve 10 comprises only three ports instead of four). It should also be appreciated that the switch from the first state to the second state causes ball 60 to seal the check valve vent, or hole 56, because outgoing fluid pressure (i.e., in outlet 28) is greater than return fluid pressure (i.e., in inlet 48). Cooler flow path FP2 occurs when the temperature of the fluid requires cooling.

The free-floating arrangement of disc 90 within chamber 80 is integral to the function of thermal bypass valve 10. When disc 90 snaps over center, the fluid flow carries disc 90 to the alternate position, rapidly closing the port (i.e., hole 46 or hole 26). This may cause a sudden pressure differential across disc 90. For example, inertial of moving fluid in cooler 6 causes a pressure drop (or vacuum) downstream of the disc and "pulls" on the back of disc 90. Also, inertial of stationary fluid in thermal bypass valve 10 causes pressure rise upstream and "pushes" on the top of disc 90. Because of this stress, disc 90 will mechanically snap to the alternate position. Disc 90 then resets (either thermally or due to reversing pressure conditions) and returns to its initial state. The combination of these conditions and the elastic tubing leads to cyclic water hammer, or "chatter." The check valve (i.e., ball 60 and holes 34, 36, 54, and 56) in close proximity to chamber 80 mitigates this event by venting the vacuum, thereby allowing the moving fluid in the cooler loop to decelerate without pulling on the surface of disc 90.

FIG. 6C shows thermal bypass valve 10 is a third state, which directs fluid to both bypass flow path and cooler flow path, indicated as flow path FP3 (i.e., both bypass flow and cooler flow is open). Essentially, failure of disc 90 leads to disc 90 no longer flexing back and further. Disc 90 is designed to fail in a mixed state and may exhibit a generally flat arrangement (as shown in FIG. 6C), will cease snapping back and forth, and/or exhibit a less extreme flexing. Thus, in the third state, disc 90 allows fluid flow through both hole 76A and hole 76B, thereby allowing partial flow to cooler 6 and partial flow to bypass (i.e., directly back to component 4). By allowing at least partial flow to cooler 6, failure does not result in overheating of components and thus catastrophic failure is avoided. It is estimated that failure of disc 90 will not occur before at least 100,000 cycles, which is far greater life expectancy than that of known thermal bypass systems.

It should be appreciated that in some embodiments, multiple thermal bypass valves may be arranged in parallel to increase flow volume and decrease pressure drop. For example, three thermal bypass valves 10 can be arranged in parallel with inlets 24 connected to component 4, outlets 44 connected to component 4, and outlets 28 (and inlets 48) connected to cooler 6. Each of the three thermal bypass valves 10 may have discs 90 exhibiting different thermal expansion coefficients or hysteresis. Thus, the first thermal bypass valve 10 may change from the first state to the second state at 50 degrees Celsius, the second thermal bypass valve 10 may change from the first state to the second state at 70 degrees Celsius, and the third thermal bypass valve 10 may change from the first state to the second state at 100 degrees Celsius. This arrangement would allow for a gradual amount of fluid to flow through cooler 6, and component 4 (i.e., a stepped cool/bypass mix).

Figure 7:
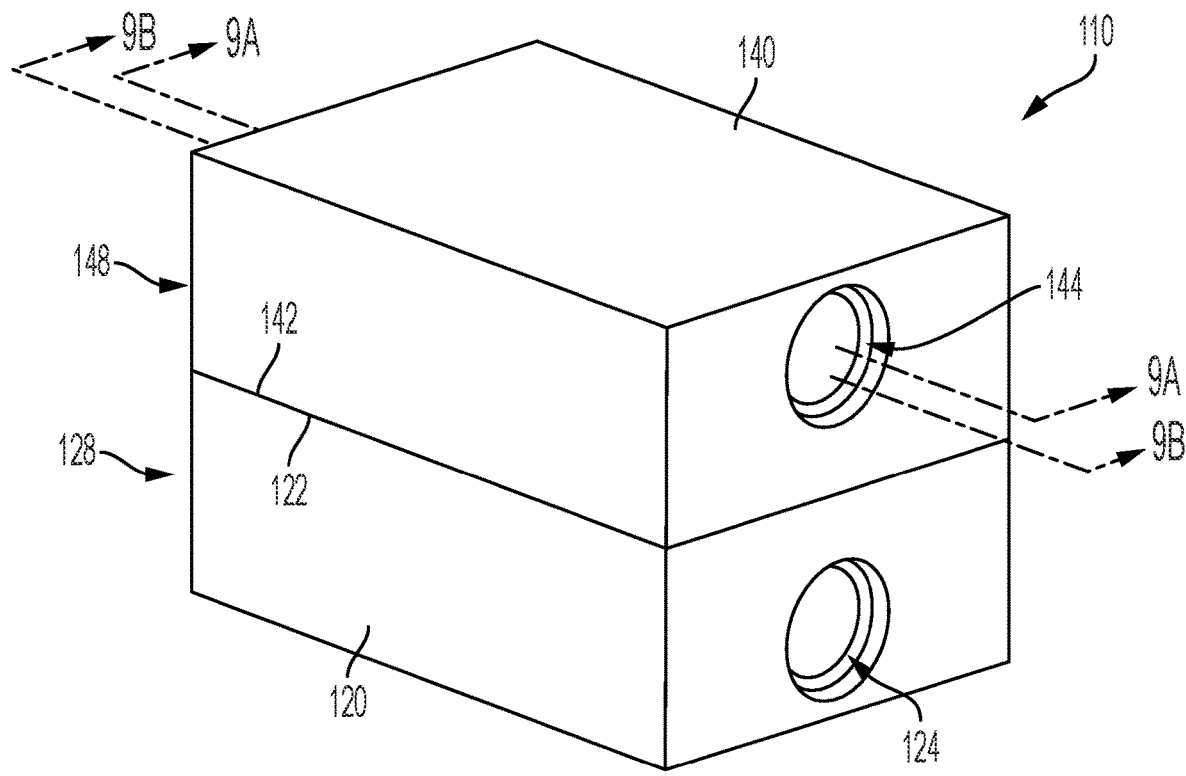
FIG. 7 is a perspective view of a thermal bypass valve.
Figure 8:
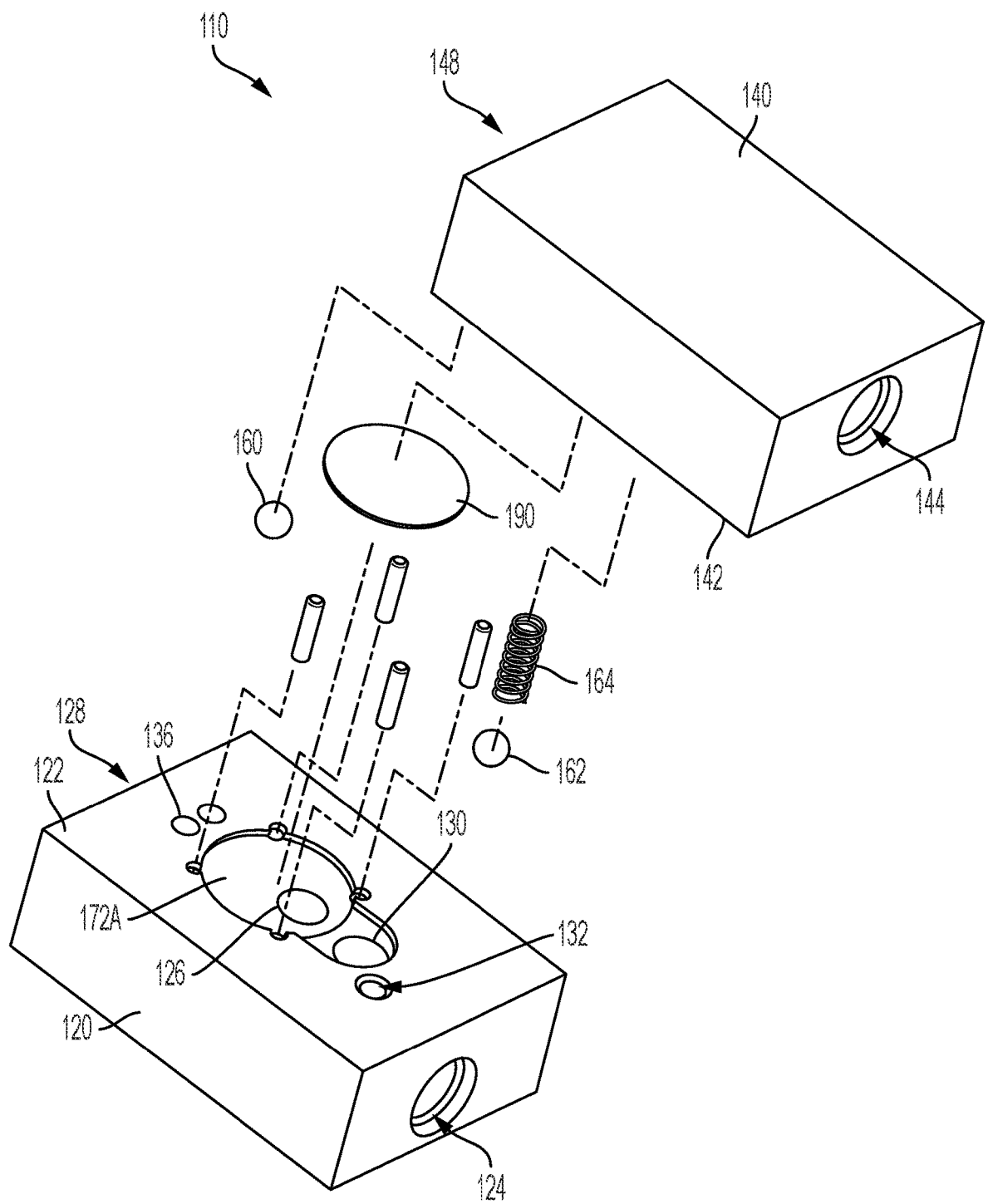
FIG. 8 is an exploded perspective view of the thermal bypass valve shown in FIG. 7.
Figure 9A:
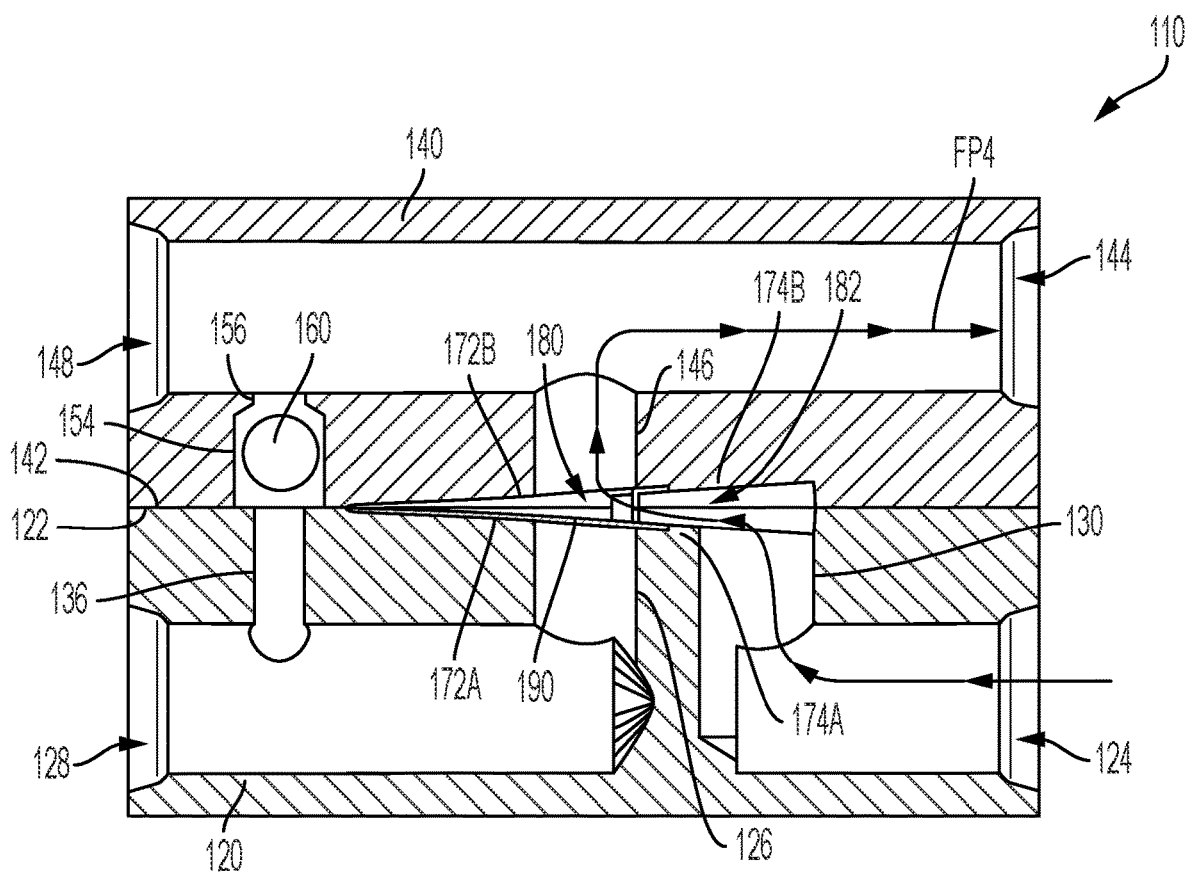
FIG. 9A is a cross-sectional view of the thermal bypass valve taken generally along line 9A-9A in FIG. 7, in a first state; and,
FIG. 9B is a cross-sectional view of the thermal bypass valve taken generally along line 9B-9B in FIG. 7, in a second state.
Figure 9B:
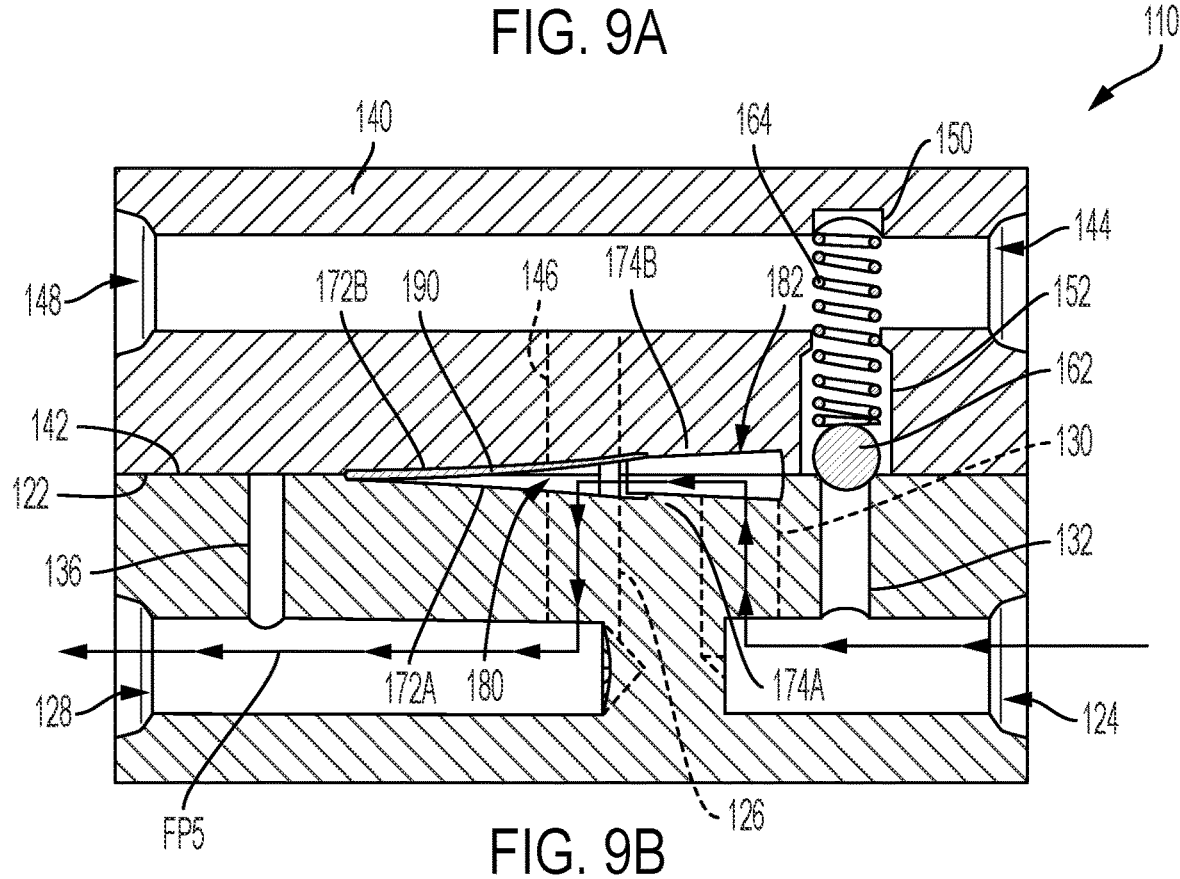

FIG. 7 is a perspective view of thermal bypass valve 110. FIG. 8 is an exploded perspective view of thermal bypass valve 110. FIG. 9A is a cross-sectional view of thermal bypass valve 110 taken generally along line 9A-9A in FIG. 7, in a first state (i.e., enabling bypass flow). FIG. 9B is a cross-sectional view of thermal bypass valve 110 taken generally along line 9B-9B in FIG. 7, in a second state (i.e., enabling cooling flow). Thermal bypass valve 110 generally comprises inferior component 120, superior component 140, and bimetallic disc 190. The following description should be read in view of FIGS. 2 and 7-9B.

Inferior component 120 comprises surface 122 operatively arranged to engage superior component 140 to form chamber 180 and passage 182, inlet 124, and outlet 128. Inlet 124 is fluidly connected to and receives fluid from component 4. Outlet 128 is fluidly connected to cooler 6. Inferior component 120 further comprises hole 130 extending from surface 122 to inlet 124, and hole 126 extending from surface 122 to outlet 128. Inlet 124, hole 130, hole 126, and outlet 128 create flow path FP5, as will be described in greater detail with respect to FIG. 9B.

Inferior component 120 further comprises hole 132, and hole 136. Hole 132 extends from surface 122 and is at least partially aligned with hole 152 of superior component 140. Hole 132 is in fluid communication with inlet 124 and outlet 144 to create a pressure relief valve, as will be described in greater detail below. Hole 136 extends from surface 122 and is at least partially aligned with hole 154 and/or hole 156 of superior component 140. In some embodiments, and as shown in FIG. 8, inferior component 120 comprises two holes 136. Holes 136 are in fluid communication with outlet 128 and inlet 148 to create a check valve, as will be described in greater detail below. In some embodiments, inferior component 120 comprises aluminum, plastic, wood, cast iron, or any other suitable material for fluid flow.

Superior component 140 comprises surface 142 operatively arranged to engage inferior component 120, outlet 144, and inlet 148. Outlet 144 is fluidly connected to component 4. Outlet 144 is operatively arranged to direct fluid to component 4 in the first state (see bypass flow of FIG. 9A). In some embodiments, outlet 144 is operatively arranged to direct cooled fluid to component 4 in the second state (i.e., cooler flow) or in the third state (i.e., failure mode flow), as will be described in greater detail below. Superior component 140 further comprises hole 146 extending from surface 142 to outlet 144. Inlet 124, hole 146, and outlet 144 create flow path FP4, as will be described in greater detail with respect to FIG. 9A.

Superior component 140 further comprises hole 150, hole 152, hole 156, and hole 154. Hole 150 extends from surface 142 and is at least partially aligned with hole 132 of inferior component 120. Hole 152 extends from surface 142 and is at least partially aligned with hole 132 of inferior component 120. Holes 150 and 152 extend from inlet 124 to outlet 144. As best shown in FIG. 9B, spring 164 comprises a first end seated and/or arranged in hole 150 and a second end generally arranged in hole 152. Ball 162 is arranged in hole 152 and engages the second end of spring 164. Spring 164 biases ball 162 towards inferior component 120 such that ball 162 is seated on hole 132 and prevents fluid flow from hole 132 to holes 150 and 152. In case of a downstream pressure build up, ball 162 will be forced away from hole 132 thereby compressing spring 164 and allowing fluid flow from hole 132 to holes 150 and 152 and thus to outlet 144. This system, namely, holes 132, 150, and 152, ball 162, and spring 164 is referred to herein as a pressure relief valve. Release of the pressure relief valve would occur if the pressure at inlet 124 is greater than fluid pressure at outlet 144, for example, if there is some blockage in cooler flow path FP5 (i.e., cooler 6, hole 126, or outlet 128) or in bypass flow path FP4 (i.e., passage 182 or hole 146).

Hole 156 extends from surface 142 and is in fluid communication with inlet 148 and outlet 128, via hole(s) 136. Hole 154 extends from surface 142 is also in fluid communication with inlet 148 and outlet 128, via hole(s) 136. Hole 154 may be a counterbore and/or a countersink to hole 156 and may include a cylindrical portion and a frusto-conical portion. Hole 154 is arranged to engage ball 160. As best shown in FIGS. 9A-9B, ball 160 is idly arranged within hole 154. By idly it is meant that there is no biasing element engaged with ball 160, and ball 160 is allowed to float within hole 154. At times of high pressure within outlet 128 compared to that of inlet 148, ball 160 is forced upward and into engagement with hole 156, thereby fluidly blocking hole 156. Such blockage prevents fluid from flowing from outlet 128 to inlet 148 through holes 136 and 156. Contrarily, at times of immediate high pressure within inlet 148 compared to that of outlet 128, ball 160 is unseated from hole 156 and allows fluid flow between inlet 148 and outlet 128 through holes 156 and 136. This system, namely, holes 136, 154, and 156, and ball 160 is referred to herein as a check valve. Seal of the check valve generally occurs when thermal bypass valve 110 switches from the first state, or bypass flow path FP4, shown in FIG. 9A, to the second state, or cooler flow path FP5, shown in FIG. 9B. Opening of the check valve generally occurs when thermal bypass valve 110 switches from the second state, or cooler flow path FP5, shown in FIG. 9B, to the first state, or bypass flow path FP4, shown in FIG. 9A. In some embodiments, superior component 140 comprises aluminum, plastic, wood, cast iron, or any other suitable material for fluid flow.

Inferior component 120 and superior component 140 further comprise respective surfaces 172A and 172B directed toward each other, creating chamber 180. In some embodiments, components 120 and 140 are connected via pins or pegs or dowels; however, it should be appreciated that components 120 and 140 may be connected using any suitable means, for example, bolts, rivets, screws, nails, adhesives, interference fit, etc. It should be appreciated that pins allow for both easy assembly alignment and provide a durable wear surface to prevent binding between disc 190 and components 120 and 140. Specifically, the pins prevent bimetallic disc 190 from damaging inferior component 20 or superior component 40, since bimetallic disc 190 may comprise a harder material than that of the surrounding components. Thus, pins should comprise a generally hard material, such as steel. In some embodiments, and as shown in FIG. 8, thermal bypass valve 110 comprises four pins that generally surround disc 90.

Inferior component 120 comprises surface 172A and lip or protrusion 14A. Surface 172A is a curvilinear surface comprising a first radius. Lip 174A extends outward from surface 172A. Superior component 140 comprises surface 172B and lip or protrusion 174B. Surface 172B is a curvilinear surface comprising a second radius, the second radius being substantially equal to the first radius. Lip 174B extends outward from surface 172B. When properly assembled, surfaces 172A-B form a wedge-shaped chamber 180 and lips 174A-B form passage 182. Passage 182 allows fluid flow from inlet 124 to either outlet 128 (flow path FP5) or outlet 144 (flow path FP4).

Disc 190 is arranged in chamber 180. Disc 190 is a bimetallic disc. As is known in the art, a bimetallic disc comprises at least two metals (e.g., iron and manganese). As the temperature changes the metals will flex and pull against each other. Since the metals expand and contract at different rates (i.e., each metal has a different thermal expansion coefficient), each side can be formed to flex (or snap) at a desired temperature. It should be appreciated that the materials of disc 190 can be chosen for the desired effect (e.g., different actuation temperature ranges). Disc 190 exhibits curvature in both states, the curvature of both states having a third radius. In some embodiments, the third radius is greater than the first and second radii of surfaces 172A-B. This allows the seal between disc 190 and surfaces 172A-B to occur right at the port (i.e., holes 126 and 146) and some fluid to exist between disc 190 and the sealed surface 172A or 172B, reducing the pressure differential across disc 190 and allowing easier snapping when there is a temperature change. Disc 190 is arranged such that a first end is arranged proximate passage 180 and lips 174A-B and a second end is arranged distal to passage 180 and lips 174A-B. In some embodiments, Disc 190 "floats" relative to components 120 and 140; that is to say disc 190 is not fixedly connected to, or pinched by, components 120 and 140. The floating design of disc 190 and the face seal (i.e., formed between disc and surfaces 172A-B) is less susceptible to debris that might cause binding in current thermal valve systems. In some embodiments, disc 190 is connected at its distal end to components 120 and 140 (i.e., pinched in the smaller wedge portion of chamber 190). Disc 190, namely the proximal portion thereof, is operatively arranged to pivot or flip back and forth from engagement with inferior component 120 and superior component 140 based on fluid temperature. It should be appreciated that while disc 190 is shown as a generally circular disc, other geometric shapes may be used. For example disc 190 may comprise a plate shaped as a rectangle, square, oval, ellipsoid, trapezoid, etc. It should be further appreciated that, while thermal bypass valve 110 only shows one disc 190, in some embodiments a plurality of discs may be stacked and arranged in chamber 180.

FIG. 9A shows thermal bypass valve 110 in a first state, which directs fluid to bypass flow path FP4 (i.e., bypass flow is open and cooler flow is closed). In the first state, the fluid temperature, and thus the temperature of disc 190, is below a predetermined temperature and disc 190 is directed or pivoted toward engagement with surface 172A of inferior component 120. Such arrangement blocks fluid flow into hole 126 and outlet 128. In bypass flow path FP4, fluid flows (from component 4) into inlet 124, through hole 130 and passage 182, and into chamber 180. With bimetallic disc 190 flexed downward, fluid then flows up through hole 146 and exits thermal bypass valve 110 through outlet 144 (and back to component 4). It should be appreciated that the proximal end of disc 190 is tucked beneath lip 174A. This prevents the fluid flow from lifting disc 190 up off of surface 172A. It should also be appreciated that ball 160 of the check valve is in a neutral or idle state (i.e., unseated from hole 156). Bypass flow path FP4 occurs when the temperature of the fluid does not require cooling.

FIG. 9B shows thermal bypass valve 110 in a second state, which directs fluid to cooler flow path FP5 (i.e., bypass flow is closed and cooler flow is open). The switch to cooler flow occurs when the fluid temperature, and thus the temperature of disc 190, is greater than or equal to the predetermined temperature and disc 190 snaps over such that it is directed or pivoted toward engagement with surface 172B of superior component 140. Such arrangement blocks fluid flow into hole 146 and outlet 144. In cooler flow path FP5, fluid flows (from component 4) into inlet 124, through hole 130 and passage 182, and into chamber 180. With bimetallic disc 190 flexed upward, fluid then flows down through hole 126 and exits thermal bypass valve 110 through outlet 128 (to cooler 6). It should be appreciated that the proximal end of disc 190 is tucked beneath lip 174B. This prevents the fluid flow from lifting disc 190 up off of surface 172B. In some embodiments, and as shown in FIG. 2, fluid then flows from cooler 6 back into thermal bypass valve 110 through inlet 148 and to component 4 via outlet 144. In some embodiments, cooler 6 may return cooled fluid to component 4 via other means (i.e., not through inlet 148 and outlet 144). In such embodiments, thermal bypass valve 110 may or may not comprise inlet 148 (i.e., thermal bypass valve 110 comprises only three ports instead of four). It should also be appreciated that the switch from the first state to the second state causes ball 160 to seal the water hammer vent, or hole 156, because outgoing fluid pressure (i.e., in outlet 128) is greater than return fluid pressure (i.e., in inlet 148). Cooler flow path FP5 occurs when the temperature of the fluid requires cooling.

The free-floating arrangement of disc 190 within chamber 180 is integral to the function of thermal bypass valve 110. When disc 190 snaps over center, the fluid flow carries disc 190 to the alternate position, rapidly closing the port (i.e., hole 146 or hole 126). This may cause a sudden pressure differential across disc 190. For example, inertial of moving fluid in cooler 6 causes a pressure drop (or vacuum) downstream and "pulls" on the back of disc 190. Also, inertial of stationary fluid in thermal bypass valve 110 causes pressure rise upstream and "pushes" on the top of disc 190. Because of this stress, disc 190 will mechanically snap to the alternate position. Disc 190 then resets (either thermally or due to reversing pressure conditions) and returns to its initial state. The combination of these conditions and the elastic tubing leads to cyclic water hammer, or "chatter." The check valve (i.e., ball 160 and holes 136, 154, and 156) in close proximity to chamber 180 mitigates this event by venting the vacuum, thereby allowing the moving fluid in the cooler loop to decelerate without pulling on the surface of disc 190. Thermal bypass valve 110 may also exhibit a third state (similar to that shown in Figure C), wherein fluid is directed to both bypass flow path and cooler flow path in a failed state of disc 190.

It will be appreciated that various aspects of the disclosure above and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE NUMERALS

2 Cooling system
4 Component
6 Cooler
10 Thermal bypass valve
20 Inferior component
22 Surface
24 Inlet
26 Hole
28 Outlet
30 Hole
32 Hole
34 Hole
36 Hole
40 Superior component
42 Surface
44 Outlet
46 Hole(s)
48 Inlet
50 Hole
52 Hole
54 Hole
56 Hole
60 Ball
62 Ball
64 Spring
70A Insert
70B Insert
72A Surface
72B Surface
74A Lip or protrusion
74B Lip or protrusion
76A Hole
76B Hole
80 Chamber
82 Passage
90 Disc
110 Thermal bypass valve
120 Inferior component
122 Surface
124 Inlet
126 Hole
128 Outlet
130 Hole
132 Hole
136 Hole(s)
140 Superior component
142 Surface
144 Outlet
146 Hole
148 Inlet
150 Hole
152 Hole
154 Hole
156 Hole
160 Ball
162 Ball
164 Spring
172A Surface
172B Surface
174A Lip or protrusion
174B Lip or protrusion
180 Chamber
182 Passage
190 Disc
FP1 Flow path
FP2 Flow path
FP3 Flow path
FP4 Flow path
FP5 Flow path

What is claimed is:

1. A thermal bypass valve for diverting fluid, comprising:
an inlet;
a chamber in fluid communication with the inlet;
a bimetallic disc pivotably arranged in the chamber;
a first outlet in fluid communication with the chamber; and,
a second outlet in fluid communication with the chamber;
wherein the chamber comprises:
a first curvilinear surface; and,
a second curvilinear surface directed toward the first curvilinear surface;
wherein the bimetallic disc is operatively arranged to:

in a first state, divert fluid to the first outlet; and, in a second state, when the fluid reaches a predetermined temperature, divert the fluid to the second outlet wherein in a third state, the bimetallic disc is operatively arranged to divert fluid to both the first outlet and the second outlet wherein in a third state, the bimetallic disc is operatively arranged to divert fluid to both the first outlet and the second outlet.

2. The thermal bypass valve as recited in claim 1, further comprising a pressure relief valve fluidly arranged between the inlet and the first outlet.

3. The thermal bypass valve as recited in claim 2, wherein the pressure relief valve comprises:
   a spring, and,
   a ball.

4. The thermal bypass valve as recited in claim 1, further comprising a check valve fluidly arranged between the second outlet and the first outlet.

5. The thermal bypass valve as recited in claim 4, wherein the check valve comprises a ball idly arranged in a check valve passage.

6. The thermal bypass valve as recited in claim 1, wherein the chamber is wedge shaped.

7. The thermal bypass valve as recited in claim 1, wherein the chamber further comprises:
   a first lip extending from the first curvilinear surface; and,
   a second lip extending from the second curvilinear surface, wherein a passage is formed between the first lip and the second lip.

8. The thermal bypass valve as recited in claim 1, wherein:
   the first curvilinear surface comprises a first radius;
   the second curvilinear surface comprises a second radius; and,
   the bimetallic disc comprises a third radius, the third radius being greater than the first radius and the second radius.

9. A thermal bypass valve for diverting fluid, comprising:
   a first inlet;
   a chamber in fluid communication with the inlet;
   a bimetallic disc pivotably arranged in the chamber;
   a first outlet in fluid communication with the chamber;
   a second inlet in fluid communication with the first outlet; and,
   a second outlet in fluid communication with the chamber;
   wherein the chamber comprises:
      a first curvilinear surface; and,
      a second curvilinear surface directed toward the first curvilinear surface
   wherein the bimetallic disc is operatively arranged to:
      in a first state, divert fluid to the first outlet; and,
      in a second state, when the fluid reaches a predetermined temperature, divert the fluid to the second outlet wherein in a third state, the bimetallic disc is operatively arranged to divert fluid to both the first outlet and the second outlet wherein in a third state, the bimetallic disc is operatively arranged to divert fluid to both the first outlet and the second outlet.

10. The thermal bypass valve as recited in claim 9, further comprising a pressure relief valve fluidly arranged between the first inlet and the first outlet, the pressure relief valve being biased toward a sealed position.

11. The thermal bypass valve as recited in claim 9, further comprising a check valve fluidly arranged between the second outlet and the second inlet.

12. The thermal bypass valve as recited in claim 11, wherein the check valve comprises a check valve passage and a ball idly arranged in the check valve passage.

13. The thermal bypass valve as recited in claim 9, wherein the chamber is wedge shaped.

14. The thermal bypass valve as recited in claim 9, wherein the chamber further comprises:
   a first lip extending from the first curvilinear surface; and,
   a second lip extending from the second curvilinear surface, wherein a passage is formed between the first lip and the second lip.

15. The thermal bypass valve as recited in claim 9, wherein:
   the first curvilinear surface comprises a first radius;
   the second curvilinear surface comprises a second radius; and,
   the bimetallic disc comprises a third radius, the third radius being greater than the first radius and the second radius.

16. The thermal bypass valve as recited in claim 9, wherein the chamber and the first inlet are linearly aligned.

* * * * *